UNITED STATES PATENT OFFICE.

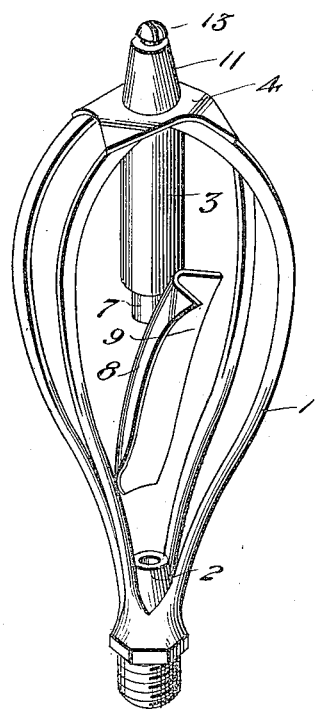
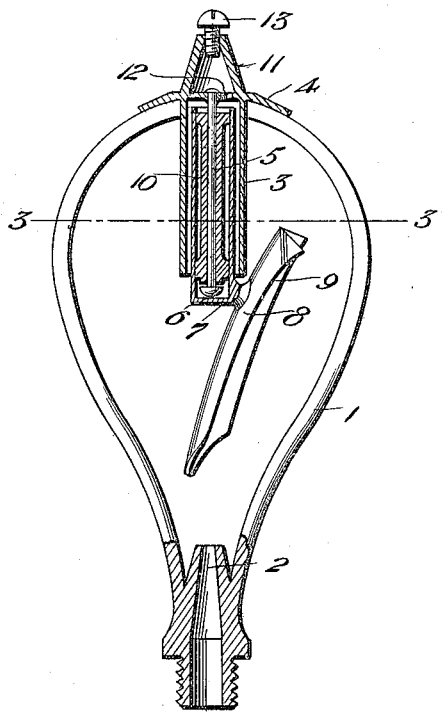
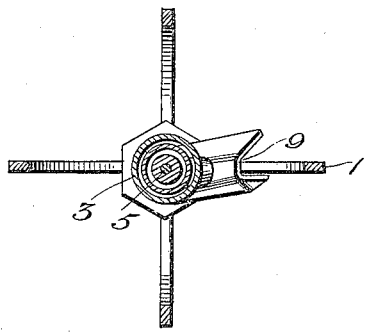

HUGH PARTRIDGE, OF JACKSONVILLE, FLORIDA, ASSIGNOR TO CHARLES SHAD AND MARTIN G. WILLIAMS, BOTH OF JACKSONVILLE, FLORIDA.

SPRINKLER.

1,322,466.      Specification of Letters Patent.      Patented Nov. 18, 1919.

Application filed November 30, 1917, Serial No. 204,753. Renewed June 14, 1919. Serial No. 304,282.

*To all whom it may concern:*

Be it known that I, HUGH PARTRIDGE, a citizen of the United States, residing at Jacksonville, in the county of Duval and State of Florida, have invented new and useful Improvements in Sprinklers, of which the following is a specification.

This invention is an improved rotary sprinkler for use in connection with hose and hose attachments, pipes and pipe attachments for sprinkling purposes, the object of the invention being to provide an improved device of this character which sprinkles water evenly, which works under any ordinary water pressure, which is not likely to clog, which is thoroughly practical and efficient in operation, is strong and durable and avoids the use of packing or gears of any kind, presents no tight joints to clog, no small holes to necessitate cleaning and in which the bearing is protected from the water and hence is not liable to corrode.

The invention consists in the construction, combination and arrangement of devices hereinafter described and claimed.

In the accompanying drawings:—

Figure 1 is a perspective view of a sprinkler constructed and arranged in accordance with my invention.

Fig. 2 is a longitudinal central sectional view of the same.

Fig. 3 is a detailed transverse sectional view of the same.

In the embodiment of my invention I provide a frame 1 which is substantially pyriform and at the inner or smaller end of which is a nozzle 2. In the outer end of the frame and concentric with the axis of the nozzle is a cylindrical shield 3 which hangs from the top or cap 4 of the frame and is opened at its inner end. A shaft 5 which is also concentric with the axis of the nozzle has its outer end secured to the cap or top 4 and is provided with a head 6 at its inner end.

The rotary sprinkler element comprises a cylindrical hub member 7 and a wing 8, the wing being secured to the inner end of the hub member, being channeled in its outer side as at 9 and being arranged obliquely to the axis of the nozzle and so that the inner end of the wing is on one side of said axis and the outer end of said wing is on the opposite side thereof. Hence the jet of water directed through the nozzle is caused to strike the wing at a point near but slightly spaced from the inner end of the wing and the full force of the jet is exerted against the wing and in the channel thereof so that the sprinkler member is caused to revolve and to sprinkle and spread the water evenly and in all directions.

In the cylindrical hub member is a bearing 10, of Babbitt or other suitable material and through the bore of which the shaft 5 extends so that the said bearing, together with the sprinkler member or element is arranged to revolve on the shaft. The tubular or cylindrical hub member is closed at its outer end and is arranged in the shield 3 which is open at its inner end and hence, the wing being arranged at the inner end of the hub member and obliquely and across the axis of the nozzle the bearing is entirely protected and water and dirt are prevented from getting therein and clogging the same. At the outer end of the frame, on the top or cap 4, is a substantially conical oil cup 11 which communicates with the bearing through an opening 12 and which is provided with a closure 13, which is here shown as a headed screw. Oil for lubricating the bearing may be readily introduced through the oil cup when the closure screw 13 is removed. The closure screw is then replaced and the oil in the cup serves to lubricate the bearing for a considerable length of time. The sprinkler element revolves easily, and the device is operative at any ordinary water pressure, from five pounds up.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. A sprinkler comprising a frame having a nozzle projecting thereinto at one end, a cap at the opposite end of the frame and provided with a cylindrical shield projecting toward the nozzle and open at its inner end, a revoluble sprinkler element in the frame and having a cylindrical hub member arranged within the shield, open at its outer end and closed at its inner end, a bearing arranged within the hub member, and a shaft secured to the cap and extending through the bearing and on which the latter, together with the sprinkler element, revolves.

2. A sprinkler comprising a frame having a nozzle projecting thereinto at one end, a cap at the opposite end of the frame and provided with a cylindrical shield projecting toward the nozzle and open at its inner end, a revoluble sprinkler element in the frame and having a cylindrical hub member arranged within the shield, open at its outer end and closed at its inner end, a bearing arranged within the hub member, and a shaft secured to the cap and extending through the bearing and on which the latter, together with the sprinkler element, revolves, said cap being also provided with an oil cup on its outer side which communicates with said bearing.

In testimony whereof I affix my signature.

HUGH PARTRIDGE.